United States Patent [19]

Hokanson et al.

[11] 3,957,951

[45] May 18, 1976

[54] PROCESS FOR REMOVING CONTAMINANTS FROM HOT WASTE GAS STREAMS

[75] Inventors: Allan E. Hokanson; Raphael Katzen, both of Cincinnati, Ohio; Edward F. Button, Greenwich, Conn.

[73] Assignee: International Telephone and Telegraph Corporation, New York, N.Y.

[22] Filed: Aug. 23, 1974

[21] Appl. No.: 499,837

[52] U.S. Cl. .................................................. 423/242
[51] Int. Cl.² ........................................... C01B 17/00
[58] Field of Search ............................. 423/242–244

[56] References Cited
UNITED STATES PATENTS

| | | | |
|---|---|---|---|
| 2,134,481 | 10/1938 | Johnstone | 423/242 X |
| 2,233,841 | 3/1941 | Lepsoe | 423/242 X |
| 3,645,671 | 2/1972 | Griffin et al. | 423/242 |
| 3,733,777 | 5/1973 | Huntington | 423/242 X |
| 3,822,339 | 7/1974 | Mizuno et al. | 423/242 |

*Primary Examiner*—Oscar R. Vertiz
*Assistant Examiner*—Gregory A. Heller
*Attorney, Agent, or Firm*—James B. Raden; Harold J. Holt

[57] ABSTRACT

A process for removing sulfur dioxide and other contaminants from a hot waste gas stream in which the waste gas stream is cooled to a temperature below 100°F and then passed in sequence through two separate absorption zones utilizing as the absorbent a recirculated aqueous solution of ammonium sulfite-bisulfite salts. Heat is continuously withdrawn from the recirculated salt solution in each zone. The absorbent solution in the first zone has an initial pH of from 6 to 7.2 and a salt concentration of from 1 to 20% by weight. The absorbent solution in the second zone has an initial pH of from 5.2 to 6.5 and a salt concentration, lower than said first zone of, from 0.1 to 5% by weight. The process provides for the efficient absorption and substantial removal of $SO_2$, $SO_3$ and particulate contaminants and for the economic recovery and use of heat from stack gases of a variety of industrial and commercial operations.

12 Claims, 1 Drawing Figure

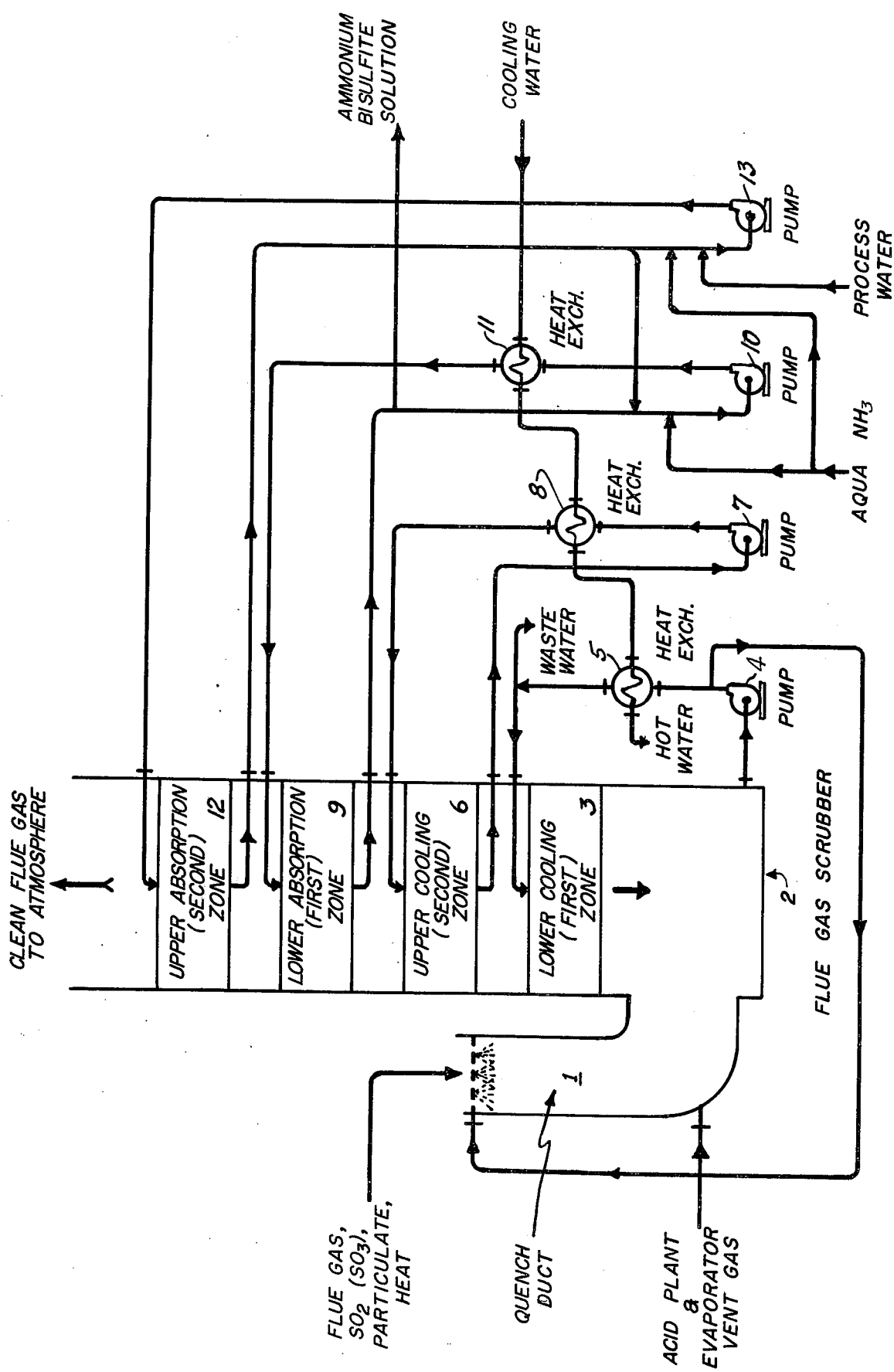

PROCESS FOR REMOVING CONTAMINANTS FROM HOT WASTE GAS STREAMS

This invention relates to process of removing sulfur dioxide and other contaminants from a hot waste gas stream.

The control of air pollution resulting from the discharge into the atmosphere of sulfur dioxide and other contaminants from stack or flue gases has become increasingly urgent. Many processes have been proposed for the removal of such contaminants, including the use of aqueous solutions of ammonium sulfite and ammonium bisulfite. However, the successful reduction of sulfur dioxide emissions to the atmosphere to environmentally acceptable levels involves a number of problems in addition to absorption of a major part of the sulfur dioxide.

Effective absorption of sulfur dioxide using ammoniacal solutions requires cooling of the stack or flue gases from elevated temperatures of about 300° to 500°F to temperatures at which the partial pressures of ammonia and sulfur dioxide above the ammoniacal solutions are at very low levels. Additionally, in furnace operations evolving $SO_2$, there is virtually always a small but significant amount of $SO_3$. Ammoniacal solutions used as absorbents have a small but finite partial pressure of ammonia vapor which reacts with $SO_3$ and $SO_2$, particularly the former, to form fumes primarily of submicron particle size. These fumes are difficult to wet and absorb and therefore create a secondary pollution problem in the atmosphere.

It is accordingly an object of the present invention to provide an economical process for the efficient and effective absorption and removal of sulfur dioxide and sulfur trioxide from a heated waste gas stream.

It is an additional object of this invention to provide a process which, in addition to $SO_2$ and $SO_3$ removal, provides for the essentially complete removal of particulate contaminants from such waste gas streams.

It is still an additional object of this invention to provide a process which achieves the foregoing objectives while additionally providing for both the economic recovery and utilization of heat from the hot waste gas stream.

The present invention removes $SO_2$ and other contaminants from a hot waste gas stream by utilization as the absorbent of a recirculated aqueous solution of ammonium sulfite and ammonium bisulfite. Essentially complete $SO_2$ recovery and elimination of fume formation is achieved by cooling the hot waste gas to a temperature below about 100°F and then passing the waste gas stream through at least two separate absorption zones while continuously withdrawing heat from the recirculated salt solution in each zone. This will usually result in the temperature of the waste gas stream being successively reduced as it passes through each of the zones. The absorbent in the first zone has an initial pH of from 6 to 7.2, preferably 6.6 to 7, and a salt concentration of from 1 to 20%, preferably about 2 to 8%, and even more preferably about 2.6 to 6.1% by weight. The absorbent in the second zone has a pH of from 5.2 to 6.5, preferably about 5.8 to 6.2, and a salt concentration lower than said first zone of from 0.1 to 5%, preferably about 0.3 to 1.0%, and even more preferably about 0.3 to 0.5% by weight.

The single figure of the drawing is a simplified diagrammatic illustration of one embodiment of the process of the invention.

The use of more than one absorption zone in stack gas scrubbing systems is known. However, the present process involves the use of two absorption zones under conditions such that they perform a unique combination of functions. The first absorption zone utilizing recirculated aqueous salt solution operates to recover most of the $SO_2$ from the hot gases, generally from 80 to 95%. This is accomplished by controlling the initial pH and salt concentration of the absorbents so that they are within certain ranges, both of which are higher than the second zone. A higher initial pH in the first stage recirculating stream than in the second stage results in a greater driving force for the acidic $SO_2$ to react with alkaline ammonium sulfite and alkaline ammonium hydroxide (to form ammonium sulfite and ammonium bisulfite respectively). These conditions, although maximizing $SO_2$ absorption, do result in emission of ammonia at the top of the first or lower absorption zone.

The superimposition of the second or upper absorption zone acts to reduce ammonia vapor pressure and thus fume formation. This is accomplished by use of lower temperatures, less alkalinity at the top entry point of the absorbent solution, and lower salt concentration than the first zone. The lower temperature, initial pH and salt concentration reduces ammonia vapor pressure over the solution, thus reducing ammonia losses and fume formation. In addition, the lower temperature in the second absorption zone improves $SO_2$ absorption from the gases, which are now very low in $SO_2$ concentration. Thus the two absorption zones act in concert to maximize the efficient removal of $SO_2$ and minimize fume formation.

Prior to passage of the hot waste gas stream through the absorption zones, the gas stream is cooled to a temperature below about 100°F. This is preferably done by first quenching the flue gas with an aqueous stream in the duct upstream from the flue gas scrubber so that the gas will cool by evaporation of quench water to or near its wet bulb temperature. The gas is then passed through two or more cooling zones to further cool the gas below the wet bulb temperature and condense most of its moisture content. In the first cooling zone the gas is cooled from its wet bulb (or saturation) temperature of about 160°F to approximately 130°F, and in the second cooling zone to about 80°F. The condensed water joins the recirculating aqueous streams in the cooling loops.

In effecting this condensation, the moisture removed by condensation preferentially collects on the solid particulate matter, the particles acting as nuclei for moisture condensation. This wetting of particulate matter promotes coalescence by non-elastic collision of the particles with each other and with the aqueous stream being contacted, thus effecting essentially complete removal of the particulate contaminants. The gas may be contacted with the aqueous gas streams in the cooling zones by means of sprays, perforated trays, baffle trays, packing or other known contacting methods for effecting intimate contact of gases and liquids in essentially countercurrent flow.

After thus cooling, the stack or flue gas is at a temperature level approaching that of the coolant water, air or other secondary conduit medium, namely between 50° and 100°F and preferably between 65° and 85°F, at which level substantially all of the original high moisture content of the saturated gas has been removed by condensation, and concurrently practically all of the particulate matter has been removed.

The cooled gas, containing sulfur dioxide and attendant sulfur trioxide, is then contacted in two or more recirculating zones with an aqueous absorbent consisting essentially of a solution of ammonium sulfite and ammonium bisulfite in water. The water component required for absorption is added to the upper or second absorption loop while the bulk of the ammonia required for absorption of sulfur dioxide and attendant sulfur trioxide is added in the lower or first absorption loop. Final pH control adjustment of the absorbent entering the upper zone is made by the addition of a relatively small amount of ammonia.

Control of the two absorption zones involves the following specific considerations:

1. In the lower (first) absorption zone, the absorbate leaving the zone is essentially a solution of ammonium bisulfite in water, with only small amounts of ammonium sulfite present. If cool enough, the solution will be one of ammonium bisulfite, containing a small amount of free dissolved sulfur dioxide. There will also be a small amount of accompanying sulfate salts formed by the attendant $SO_3$.

2. Because the major part of the sulfur dioxide and attendant sulfur trioxide is absorbed in the lower absorption zone and the bulk of the ammonia is added to the recirculating stream in this loop, there is a substantial amount of heat evolved. The evolved heat comprises the heat of solution of ammonia and the heat of reaction of ammonia and then absorbed gases. This heat is removed in a heat exchanger through which the recirculating absorbate from the lower absorption zone is recycled to the top of the lower absorption zone, with withdrawal of a stream which is the net "make" of ammonium bisulfite. By special control of the rate of recirculation of the recycle stream to the feed section of the lower absorption zone the ammonia addition causes the solution to contain a ratio of ammonium sulfite to bisulfite such that the pH of the absorbent liquor returning is controlled to maximize absorption of sulfur dioxide and attendant sulfur trioxide. The initial pH of the aqueous absorbate at the top entry point of the first or lower absorption zone is from 6 to 7.2. The absorption achieved can range from at least 80 to 90% of the sulfur dioxide and sulfur trioxide present in the entering gas.

3. In the upper or second absorption zone, most of the remaining sulfur dioxide and attendant sulfur trioxide in the ascending gas is effectively absorbed, to a point where a total of at least 90%, and in most cases from 95 to 98% of the sulfur dioxide and sulfur trioxide present in the stack gas have been removed. In this upper absorption zone there is only a small amount of heat released, because the controlled addition of ammonia is relatively small, and the proportion of $SO_2$ and $SO_3$ absorbed and reacted is relatively small. Thus, there is no necessity for cooling the recirculating stream. By the addition of cold process water to the recirculating stream, there is some cooling, because the process water is lower in temperature than the flue gas passing through the upper absorption zone.

4. The control of the small amount of ammonia, the amount of the major stream of cold water or refrigerated water required for absorption, and the recirculation rate of the aqueous absorbent stream is set to develop a liquid-to-gas ratio such that the ratio of ammonium sulfite to ammonium bisulfite yields an initial pH at the top of the upper absorption zone on the order of 5.2 to 6.5, and preferably in the range of 5.8 to 6.2. The pH, combined with the low temperatures achieved by the use of cold or refrigerated water of the order of 50° to 70°F, permits final absorption of the sulfur dioxide and attendant sulfur trioxide so that remaining concentration level of these gases in the exiting flue gas stack is not more than 500 parts per million, and preferably less than 200 parts per million. In some instances, with provision of additional contacting stages in the lower and upper loops, $SO_2$ concentrations of 100 parts per million or less may be achieved. At the same time, the relatively low temperature used and the limited and controlled addition of ammonia to maintain the pH levels indicated, results in a minimum of vaporization of ammonia into the exiting gas. Thus, the concentration of ammonia in the exiting gas is not more than a few parts per million and may be as little as a fraction of a part per million.

5. By means of this controlled absorption, the ammonia concentration in the exiting gas is only a small fraction of the concentration of the remaining sulfur dioxide and sulfur trioxide. As a result, there is a minimum amount of ammonium sulfite — bisulfite and ammonium sulfate — bisulfate in the exit gas, resulting from the reaction of ammonia with the sulfur dioxide and sulfur trioxide. These reactions yield extremely fine submicron particulate matter (fume), which produces an effect called "blue haze", objectionable from both an environmental standpoint and from the standpoint of the economic use of the ammonia absorbent.

An additional important feature of the invention involves the economic recovery and use of heat. Heat is evolved from cooling of the stack gas, through condensation of the major part of the moisture contained in the water-saturated quenched gas, and also from the heats of solution and reaction in the lower, and upper, absorption zone. This heat is recovered by the use of a countercurrent heat transfer system. In this system, the coolant medium, preferably cold water, is heated by passing successively through the upper absorption loop cooler (if one is required), the lower absorption loop cooler where the major heat of solution and heat of reaction is removed and the cooling zone cooler or coolers, if one or two cooling zones are utilized, with two zones preferred. The coolant water is thus preheated to temperature levels equal to normal hot water requirements of other process operations, and may be utilized in place of steam-heated water normally used in such operations, thus effecting major fuel or energy conservation.

Alternatively, the heated recirculating aqueous cooling streams and recirculating absorption streams may be cooled by other process streams requiring evaporation. Such heated process streams may then be evaporated by flashing off water vapor at reduced pressure. As a further, although less efficient alternative, the cooling can be effected by gas streams passed successively through the heat exchangers, the heated gases then being used in process operations such as drying.

Another benefit of the present process results from the lower temperatures used to effect absorption. This minimizes oxidation reactions, which would normally result from reaction of any oxygen contained in the flue gases or stack gases (excess oxygen from combustion operations for example) with the absorbate. Such reactions result in conversion of part of the ammonium sulfite-bisulfite salts to ammonium sulfate-bisulfate. The sulfates are underisable in certain uses of the absorbate. such as ammonia-base sulfite pulping operations. In addition, such inert sulfate and bisulfate salts reduces the useful recovery of sulfur dioxide as sulfite salts, and requires an additional consumption of ammonia, which cannot be utilized in the subsequent recycle or pulping operation.

The following is a typical example of the practice of the present invention. The example is set forth in connection with the diagrammatic illustration of the process shown in the drawing.

EXAMPLE

This example illustrates the process as applied to flue gases from the burning of concentrated ammonia-base sulfite waste liquor.

As shown in the drawing, the flue gases leave the boiler furnace through an induced draft fan and are discharged from the fan at slightly more than atmospheric pressure and at a temperature of 450°F. 275,000 actual cubic feed per minute of gas at this temperature leaves the induced draft fan containing 5,000 parts per million (volume) of $SO_2$ and approximately 50 parts per million of $SO_3$. There is also particulate matter (principally fly ash) amounting to approximately 0.7 grains per standard cubic foot.

The hot gas first passes through quench duct 1 where the gas is contacted with sprays of water recirculated from the base of the flue gas scrubber 2. The recirculation rate of the quench spray water is such that there is always an excess of this water to insure that there is more than enough to evaporate into the hot gas to reduce its temperature and to saturate the gas with water vapor. Such saturation occurs at a temperature of approximately 160°F, and the quenched gas approaches this temperature within a few degrees, about 164°F. Other gas vents from the pulp mill evaporators and the acid-making plant, containing $SO_2$ as well as $SO_3$, are mixed with the flue gas either before or after quenching, so that the total water-saturated gas mixture entering the bottom of the flue gas scrubber has a sulfur dioxide content of approximately 4,000 parts per million (volume).

The quenched gas passes upward through the lower cooling zone 3 in which an aqueous stream is sprayed countercurrent to the ascending gas. The descending water spray, which completely covers the cross-section of the lower cooling zone, is heated in contact with the ascending gas to the point where the water temperature exiting at the base of this zone reaches 155°F. This hot water is then circulated by pump 4 through heat exchanger 5, where the heat is transferred to a stream of process water which is in turn brought up to a temperature of 125°F or higher for use in the pulp mill operations. The cooled recirculating water stream is passed to the top of the lower cooling zone, except for withdrawal of a net surplus aqueous stream, equivalent to the amount of moisture condensed out of the gas being cooled, this water containing most of the suspended particulate matter and dissolved soluble salts from such particulate matter, but containing negligible amounts of dissolved sulfur dioxide, because of the high temperature at which the water is removed from the bottom of the scrubber.

The partially cooled gas then passes through the upper cooling zone 6 countercurrent to another separate stream of recirculating water. The ascending gas is further cooled to a temperature of approximately 80°F, while the descending water is warmed and then recirculated by pump 7 through heat exchanger 8. In turn, it gives up heat to a process water stream which is then piped to exchanger 5 for further heating. The net make of water condensed from the gas in the upper cooling zone overflows to join the water in the lower cooling zone, and becomes part of the total net make of water which is removed from the lower cooling zone after passage through heat exchanger 5 as noted above.

In cooling and condensing moisture from the quenched, water-saturated gas, approximately 80 to 90% of the particulate matter contained therein is removed from the ascending gas, and is discharged from the system in the net make of water removed after heat exchanger 5.

The ascending gas, cooled to a temperature of about 80°F, passes into the lower absorption zone 9, which consists of three perforated trays, upon which the ascending gas is contacted countercurrently with descending recirculated absorbent. This absorbent is initially a mixture of ammonium sulfite and ammonium bisulfite, and leaves essentially as an absorbate solution of ammonium bisulfite in water. This solution, transferred through pump 10, is cooled in heat exchanger 11, transferring its heat to a process water stream which is subsequently heated in exchangers 8 and 5. Part of the cooled absorbate, equivalent to the net make of ammonium bisulfite solution, is removed from the system at this point and transferred to storage for subsequent processing in the pulp mill acid plant. This solution has an ammonium bisulfite concentration of approximately 6%.

After removal of this net make of ammonium bisulfite solution, ammonia is injected into the recirculating stream, amounting to approximately 95% of the quantity of ammonia required to react with the sulfur dioxide in the ascending gas. Also mixed with this stream is the net overflow of aqueous absorbate from the upper absorption zone. The total mixture entering the top of the lower absorption zone is at a pH of about 7 and at a temperature of 77°F. This solution acts as a strong absorbent for the sulfur dioxide and sulfur trioxide present in the ascending gas, and approximately 90% of these acidic gases is absorbed in the lower absorption zone. The heat of solution of ammonia in the recirculating stream, and the heat of reaction of sulfur dioxide and of sulfur trioxide being absorbed and reacted, raises the temperature of the absorbate and this heat is removed in exchanger 11. However, the capacity of exchanger 11 is sufficient to cool the recirculated absorbate further, so that cooling is effected of the gas warmed by heat of reaction ascending through the lower absorption zone, resulting in additional condensation of moisture from this gas, and removal of most of the small amount or residual particulate matter in this gas.

The gas leaving the lower absorption zone at 80°F then passes countercurrently through the upper absorption zone 12 against a descending stream of absorbent. This upper absorption zone consists of two perforated trays. The absorbate is essentially a dilute solution of ammonium sulfite and ammonium bisulfite, with small amounts of ammonium sulfate and bisulfate salts present. All of the water required for production of the product ammonium bisulfite solution is added to the upper absorption recirculating loop, circulated through pump 13. There is also addition of a small amount of ammonia, sufficient to control the pH of the absorbent entering the top of the upper absorption zone at a level of about 5.8. The water used is process water available at a temperature of 60°F. In the upper absorption zone 12 most of the remaining sulfur dioxide and sulfur trioxide is removed by absorption in the dilute ammonium sulfite-bisulfite solution. The net make of ammonium sulfite-bisulfite solution in this zone is transferred by level control to the lower absorption zone recirculating loop.

The cleaned flue gas leaving the upper absorption zone has been cooled to a temperature of 76°F, and contains less than 200 parts per million of sulfur dioxide, which is equivalent to removal of 95% of the sulfur dioxide present in the gas entering the flue gas scrubber. Exit gas contains less than 10 parts per million of ammonia, and therefore yields very little fume formation. The gas contains less than 2% moisture, so that at it leaves the stack, there is no visible condensing water vapor cloud, except on very cold days.

In this example, the sulfur dioxide absorbed and recovered in the ammoniacal solution as ammonium bisulfite amounts to 7,900 pounds per hour, or about 95% of the total $SO_2$ present in the entering flue gas and vent gases. The total heat recovery as hot water at 125°F amounts to 190 million Btu's per hour.

Particulate matter is removed to the extent of about 94%, from initial loading of 0.7 grains per standard cubic foot to a final level of about 0.04 grains per standard cubic foot.

Furthermore, in this example, the sulfur dioxide absorbed, along with the attendant sulfur trioxide, amounting to about 1% of the sulfur dioxide, present as ammonium salts (ammonium sulfite-bisulfite and ammonium sulfate-bisulfate), is oxidized to only a very low degree. Not more than about 1% of the sulfur dioxide so absorbed as sulfite salts is oxidized to a sulfate salts. The sulfur dioxide leaving the top of the stack amounts to less than 5% of the total sulfur dioxide entering the scrubbing system. The ammonia lost in the exiting stack gas amounts to less than 0.5% of the total ammonia used for absorption and subsequently in the pulping operation.

The process of the invention can be carried out in conventional absorption equipment, such as packed towers, perforated tray towers, baffle tray towers, spray towers and similar contactors. The process can be applied to a variety of gases containing particulate matter, sulfur dioxide and attendant sulfur trioxide, and heat. It is particularly useful for the removal of contaminants from the stack gases of spent sulfite liquor from an ammoniabase sulfite pulping operation. However, it is also useful for utility boiler stacks, and industrial and commercial boiler stacks where high sulfur content coal or fuel oil is burned, for stacks from smelters or other metallurgical operations in which sulfur-containing ores and metals are being treated, and for various chemical process operations, such as sulfuric acid manufacture, from which such gases are evolved.

We claim:

1. In a process for removing sulfur dioxide and other contaminants from a hot waste gas stream in which the waste gas stream is passed through one or more absorption zones for removal of sulfur dioxide and other contaminants, the absorption zones utilizing as the absorbent a recirculated aqueous salt solution of ammonium sulfite-bisulfite, the improvement comprising cooling said waste gas stream to a temperature below about 100°F, passing said waste gas stream in sequence through at least two separate absorption zones while continuously withdrawing heat from the recirculated salt solution in each zone, the absorbent in the first lower absorption zone have an initial pH of from 6 to 7.2 and a salt concentration of from 1 to 20% by weight, the absorbent in the second upper absorption zone having an initial pH of from 5.2 to 6.5 and a salt concentration lower than said first zone of from 0.1 to 5% by weight.

2. The process of claim 1 in which the hot waste gas stream, before passing into said absorption zones, is quenched to a temperature approaching its wet bulb temperature, and then cooled in a first cooling zone to cool said gas and condense the moisture contained therein, and said gas is then passed through at least one additional cooling zone to further cool said gas and condense said moisture.

3. The process of claim 1 in which the heat withdrawn from said waste gas stream during the cooling and absorption stage is recovered by heat transfer to an aqueous coolant medium circulated countercurrently through the successive steps of said process.

4. The process of claim 2 in which the condensation of said moisture in said cooling zones also removes substantially all particulate contaminants from said waste gas stream.

5. The process of claim 1 in which ammonia is added and ammonium bisulfite is withdrawn from said aqueous absorbent in said first absorption zone as it is recirculated in order to maintain the initial absorbent pH in said zone from 6.6 to 7.

6. The process of claim 1 in which water and ammonia is added to said aqueous absorbent in said second absorption zone as it is recirculated in order to maintain the inlet absorbent pH in said zone from 5.2 to 6.5.

7. The process of claim 1 in which the waste gas stream is cooled, prior to passing through the absorption zones, to a temperature of from 65° to 85°F.

8. The process of claim 1 in which the absorbent in the first zone has a salt concentration of 2 to 8 by weight.

9. The process of claim 1 in which the absorbent in the second zone has a pH of from 5.8 to 6.2 and a salt concentration of from 0.3 to 1.0% by weight.

10. In a process for removing sulfur dioxide, sulfur trioxide and particulate contaminants from a hot waste gas stream in which the waste gas stream is passed through one or more absorption zones for removal of sulfur dioxide and other contaminants, the absorption zones utilizing as the absorbent a recirculated aqueous salt solution of ammonium sulfite-bisulfite, the improvement comprising quenching with water said waste gas stream to approximately its wet bulb temperature, passing said waste gas stream through a first cooling zone to said gas and condense the moisture contained therein, the condensed moisture acting to remove particulate contaminants from the gas, passing said waste gas stream through at least one additional cooling zone to further cool said gas to a temperature below about 100°F and condense said moisture, the condensed moisture acting to remove substantially all remaining particulate contaminants from the gas, passing said waste gas stream in sequence through at least two separate absorption zones, continuously withdrawing heat from the recirculated salt solution in each zone so that the temperature of the water gas stream is successively reduced as it passes through each of the zones, the recirculated absorbent in the first zone absorbing most of the sulfur dioxide and having an initial pH of from 6 to 7.2 and a salt concentration of from 2 to 8% by weight, the recirculated absorbent in the second zone absorbing the sulfur trioxide and the remaining sulfur dioxide and having an initial pH of from 5.2 to 6.5 and a salt concentration of from 0.3 to 1.0% by weight.

11. The process of claim 10 in which the hot waste gas stream is from the burning of ammonia-base sulfite waste liquor.

12. The process of claim 10 in which the heat withdrawn from the waste gas stream during the quenching, cooling and absorption steps is recovered by heat transfer to an aqueous coolant medium circulated countercurrently through the successive steps of said process, said aqueous coolant thereby being heated to a temperature useful in other process operations.

* * * * *

UNITED STATES PATENT OFFICE
CERTIFICATE OF CORRECTION

Patent No. 3,957,951           Dated May 18, 1976

Inventor(s) A.E.Hokanson-R.Katzen-E.F.Button

It is certified that error appears in the above-identified patent and that said Letters Patent are hereby corrected as shown below:

IN THE SPECIFICATION,

Column 2, line 60, the term "gas" should be deleted; column 2, line 67, the term "conduit" should be -- coolant --.
Column 5, line 3, the spelling of the term -- undesirable -- should be corrected.

IN THE CLAIMS,
line 24, the word "stage" should be -- steps --;
Column 8, line 44, after "2 to 8", insert -- % --; column 8, line 60, after "to" and before "said", insert -- cool --.

Signed and Sealed this

Twenty-fourth Day of August 1976

[SEAL]

Attest:

RUTH C. MASON
*Attesting Officer*

C. MARSHALL DANN
*Commissioner of Patents and Trademarks*